No. 878,127. PATENTED FEB. 4, 1908.
J. P. DETWILER.
HORSESHOE.
APPLICATION FILED MAR. 19, 1907.
Fig. 1.
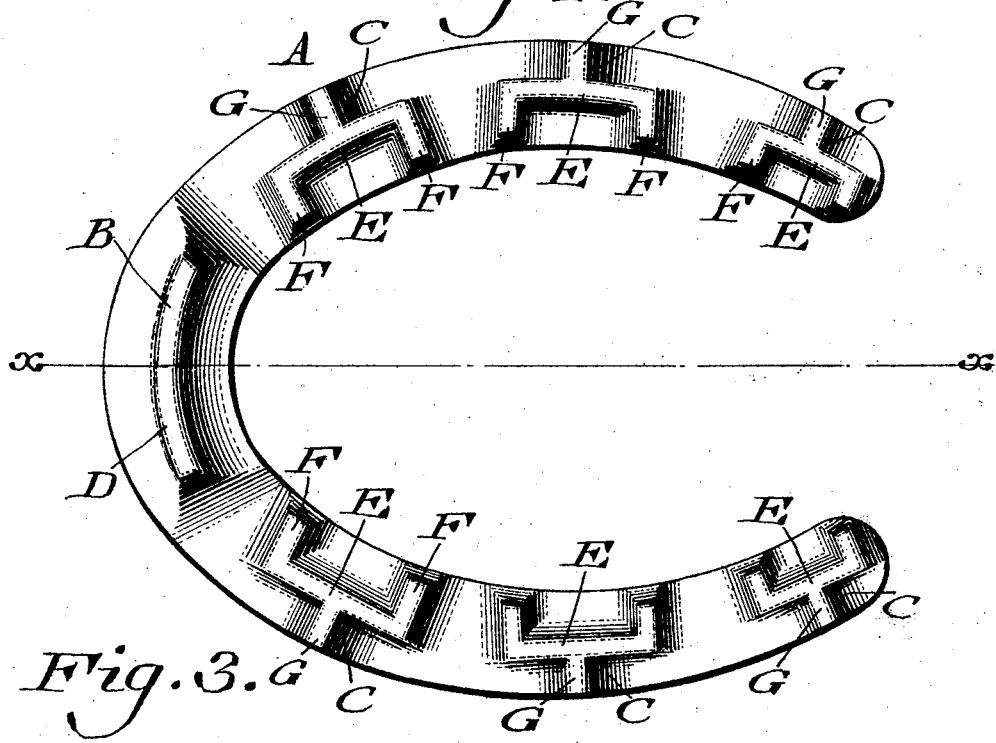
Fig. 2.
Fig. 3.
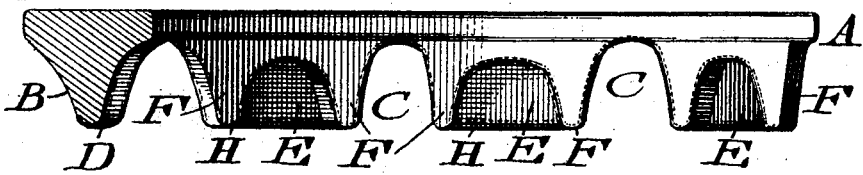
Fig. 4. Fig. 5.
Witnesses
Inventor
Jacob P. Detwiler
By Wiedersheim + Fairbanks
Attorneys

UNITED STATES PATENT OFFICE.

JACOB P. DETWILER, OF PHILADELPHIA, PENNSYLVANIA.

HORSESHOE.

No. 878,127.  Specification of Letters Patent.  Patented Feb. 4, 1908.

Application filed March 19, 1907. Serial No. 363,239.

*To all whom it may concern:*

Be it known that I, JACOB P. DETWILER, a citizen of the United States, residing in the city and county of Philadelphia, State of Pennsylvania, have invented a new and useful Horseshoe, of which the following is a specification.

My invention consists of a horse shoe having calks, which present broad surfaces to the ground without materially increasing the weight of the shoe, and enable the animal to take firm hold on the ground, as will be hereinafter described, the novelty involved being pointed out in the claims.

Figure 1 represents a side elevation of a horse shoe embodying my invention. Fig. 2 represents a bottom plan view thereof. Fig. 3 represents a longitudinal vertical section on line x—x, Fig. 2. Fig. 4 represents a perspective view of a detached portion. Fig. 5 represents a bottom plan view of a portion of a modification.

Similar letters of reference indicate corresponding parts in the figures.

Referring to the drawings:—A designates a horse shoe, composed of a body having a calk B on the toe thereof, and calks C on the sides thereof. The calk B is somewhat broad, and extends from the body in tapering direction downward and presents a narrow tread D, it being integral with said body, whereby it is strong and durable. The calks C are composed of longitudinally extending bars E, at the ends of which are transversely extending limbs F which project inwardly from said bars. Extending outwardly from said bars intermediate of the ends thereof, are the limbs G, it being noticed that said bars E and limbs F and G are integral with the body of the shoe, it being noticed also that said bars and limbs constitute the threads or tread portions H of the sides of the shoe, the same being broad and so serving to permit the animal to place himself firmly on the ground, it being also noticed that as the shoes contact with the ground the calks C engage with the same. Then the shoes roll on the bars E and limbs G, and the latter also engage with ground, so that slipping of the shoes is prevented. Furthermore, while the treads H of the calks C are of reduced thickness, the lightness of the calks is accordingly affected, while the calks are integral with the body, and so are strong and durable, while the side members F, G, of the calks, owing to their lateral or transverse projection from the bars, produce the broad treads, as has been stated.

In Fig. 5, I show a calk formed of a bar E' extending obliquely on the body with limbs F' projecting in opposite directions from the ends thereof, the intermediate limb G in the other figures being dispensed with, the results, however, being substantially the same.

While I have specified certain means for carrying out my improvements, I do not wish to be limited exactly to the same, but desire to make such changes as may come within the scope of the novelty involved.

Having thus described my invention, what I claim as new and desire to secure by Letters Patent, is:—

1. A horse shoe provided with a calk rigid therewith and comprising a body portion extending substantially in the direction of the length of the shoe, and transversely extending limbs disposed upon opposite sides of the body portion, said limbs being out of alinement with each other and each extending upon one side only of the body portion, said limbs and body portion mutually bracing each other and the shoe.

2. As an improved article of manufacture, a horse shoe having formed integral therewith calks each having a body portion substantially parallel with the inner and outer edges of the shoe and having transversely extending limbs at each end extending from one side only of said body portion, and an intermediate limb extending from said body portion in the opposite direction.

3. As an improved article of manufacture, a horse shoe having formed integral therewith calks each having a body portion substantially parallel with the inner and outer edges of the shoe and having transversely extending limbs at each end extending from one side only of said body portion, and an intermediate limb extending from said body portion in the opposite direction, said limbs being integral with the body portion and mutually bracing the same and each other.

JACOB P. DETWILER.

Witnesses:
 JOHN A. WIEDERSHEIM,
 WM. CANER WIEDERSEIM.